Sept. 24, 1935.    H. KÜPPENBENDER ET AL    2,015,314
MIRROR BASIS DISTANCE METER WITH VIEW FINDER
Filed Jan. 20, 1934
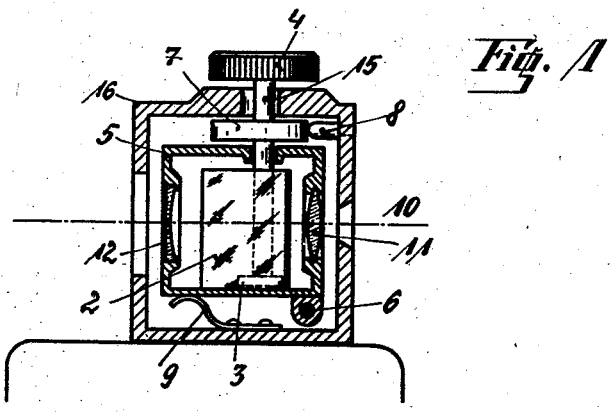
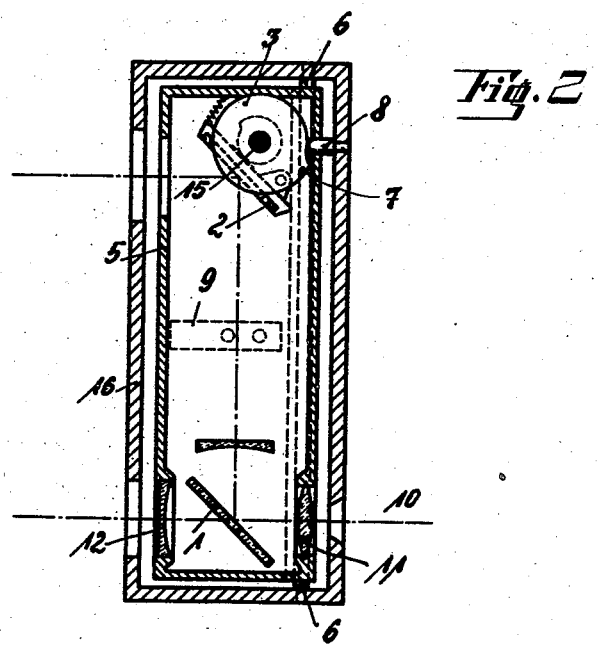
Inventors:
H. Küppenbender.
M. Nowicki.
By: Hans Hedrich
Attorney.

Patented Sept. 24, 1935

2,015,314

UNITED STATES PATENT OFFICE 2,015,314

MIRROR BASIS DISTANCE METER WITH VIEW FINDER

Heinz Küppenbender and Martin Nowicki, Dresden, Germany, assignors to Zeiss Ikon Aktiengesellschaft Dresden, Dresden, Germany Application January 20, 1934, Serial No. 707,558
In Germany January 25, 1933

2 Claims. (Cl. 88—2.4)

This invention relates to the combination of a distance meter with an arrangement for observing the object to be photographed. The view finder is connected with the distance meter in such a manner that when the distance meter is being actuated the removing of the parallax between finder and lens takes place. When such apparatus is used the object to be photographed is focused through the view finder combined with the distance meter and the latter is thereby actuated. When the distance meter is correctly adjusted the parallax between lens and view finder has been automatically removed. When the lens has been adjusted to the distance read on the distance meter the exposure can take place at once and it is certain that the dimensions of the photographic picture are accurately the same as those of the view which has appeared in the finder. The distance meter mechanism may be connected directly with the lens adjusting mechanism so that it is not necessary to separately adjust the lens after the distance has been found.

Arrangements on photographic cameras are known for removing the parallax of the finder arrangement after the distance of the object to be photographed has been ascertained and the lens has been adjusted to this distance. With these arrangements it is, however, necessary to estimate the distance of the object to be photographed from the lens of the camera and this distance has to be measured before the lens can be adjusted to this distance. Only then the desired view can be adjusted on the view finder as only after correct adjusting of the lens the parallax between view finder and lens is eliminated. Such an arrangement is complicated and little suited for instantaneous exposures.

The arrangement according to the invention considerably simplifies the taking of photographs.

An embodiment of the invention is illustrated, by way of example, in the accompanying drawing in which—

Fig. 1 shows a cross section of a combined distance meter and view finder according to the invention.

Fig. 2 is a horizontal section taken at half the height of Fig. 1.

The distance meter casing, including the view finder located therein, is positively readjusted when the distance is adjusted. 1 and 2 designate the two mirrors of the distance meter. The mirror 2 can be adjusted by means of a knob 4 through the intermediary of a cam 3 shown in dotted lines in both figures. The casing 5 of the distance meter containing the optical means can be turned on a horizontal axle 6. The knob 4 is fixed on a short vertical axle 15 which extends through the corresponding end of the casing 5. A cam disc 7 is fixed on the axle 15 at some distance above the casing 5. The cam disc 7 contacts with a pin 8 fixed on an outer casing 16. A spring blade 9 fixed at one end on the inner surface of the bottom plate of the casing 16 securely holds the disc 7 and the pin 8 continually in contact with one another.

The axis of view of the distance meter is designated by 10 and the view finder 11 is situated in this axis. It is evident that, when the distance is adjusted by means of the knob 4 the parallax of the view finder will be automatically removed.

We claim:

1. A combined distance meter and view finder for photographic cameras, comprising in combination an inclinable distance meter casing, means for adjusting the distance, means for varying the direction of view of the view finder simultaneously with the adjusting of the distance and in correspondence with the adjusted distance, a cam disc for actuating the distance adjusting means, a cam disc for actuating means adapted to compensate the parallax, a common axle for both cam discs, and means for turning this axle.

2. A combined distance meter and view finder for photographic cameras, comprising in combination a stationary casing, a movable casing mounted in said stationary casing, a resilient element in said stationary casing adapted to maintain said movable casing in its normal position in said stationary casing, optical elements in said movable casing for measuring the distance between the lens and the object to be photographed, said elements including a pivotally mounted mirror, optical means in said movable casing for viewing the picture to be photographed, means for adjusting the movable casing at an angle to the horizontal plane, said means including an axle carrying said mirror, a cam disc mounted on said axle, a nose on said stationary casing adapted to cooperate with said cam to move said movable casing out of the horizontal plane to eliminate the parallax of the view finder when said mirror is swung.

HEINZ KÜPPENBENDER.
MARTIN NOWICKI.